(12) United States Patent
Inaoka et al.

(10) Patent No.: US 9,463,611 B2
(45) Date of Patent: Oct. 11, 2016

(54) METHOD OF MANUFACTURING LIQUID EJECTING HEAD

(71) Applicant: Seiko Epson Corporation, Shinjuku-ku (JP)

(72) Inventors: Yasuo Inaoka, Shiojiri (JP); Jun Kakizaki, Sakata (JP); Yuma Fukuzawa, Matsumoto (JP); Shunsuke Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/508,171

(22) Filed: Oct. 7, 2014

(65) Prior Publication Data

US 2015/0101732 A1    Apr. 16, 2015

(30) Foreign Application Priority Data

Oct. 10, 2013  (JP) .................................. 2013-212636

(51) Int. Cl.
*B32B 41/00* (2006.01)
*B32B 37/18* (2006.01)
*B41J 2/16* (2006.01)

(52) U.S. Cl.
CPC ................ *B32B 37/18* (2013.01); *B41J 2/161* (2013.01); *B41J 2/1623* (2013.01)

(58) Field of Classification Search
CPC ................ H01L 41/083; Y10T 29/42; Y10T 29/49771; B32B 37/12; B32B 37/18
USPC .......................... 156/64, 350, 351, 378, 379
See application file for complete search history.

(56) References Cited

U.S. PATENT DOCUMENTS

2005/0121596 A1*  6/2005  Kam et al. ................. 250/201.2
2011/0205312 A1*  8/2011  Miyata et al. ................. 347/70

FOREIGN PATENT DOCUMENTS

JP    2012-183792 A    9/2012

* cited by examiner

*Primary Examiner* — Michael N Orlando
*Assistant Examiner* — Joshel Rivera
(74) *Attorney, Agent, or Firm* — Kilpatrick Townsend & Stockton LLP

(57) ABSTRACT

Disclosed is a method of manufacturing a liquid ejecting head where first and second members with different sizes which are formed of silicon are laminated with an adhesive agent. The method includes measuring a distance between a reference point which is positionally aligned in the laminating direction with respect to an imaging unit and a surface which extends from the bonding surface of the second member, and imaging the bonding surface by calculating a focal point distance of the imaging unit based on the distance which is measured and a distance between the imaging unit and the reference point.

10 Claims, 4 Drawing Sheets

METHOD OF MANUFACTURING LIQUID EJECTING HEAD

This application claims priority to Japanese Patent Application No. 2013-212636, filed Oct. 10, 2013, the entirety of which is expressly incorporated by reference herein.

BACKGROUND

1. Technical Field

The present invention relates to a method of manufacturing a liquid ejecting head which ejects a liquid from a nozzle opening, in particular, to a method of manufacturing an ink jet type recording head which discharges ink as the liquid.

2. Related Art

A liquid ejecting head has an ink jet type recording head which discharges ink droplets as a liquid. The ink jet type recording head is formed by laminating members formed of silicon in order to form a flow path with high density and high precision.

Here, when the members formed of silicon are laminated via an adhesive agent, it is necessary to confirm the bonding surfaces in a non-destructive manner. For this reason, there is proposed a manufacturing method where the bonding surfaces are confirmed in a non-destructive manner by confirming the bonding surfaces by transmitting infrared rays through the silicon members using an infrared microscope utilizing the property that infrared rays are transmitted through silicon (for example, refer to JP-A-2012-183792).

However, when trying to confirm the bonding surfaces with an infrared microscope, there is a problem that it is not possible to perform judgment of the adhesion state of the bonding surfaces with high precision since the focal point distance is not clear.

Here, this problem is not only with methods of manufacturing an ink jet type recording head, but also with methods of manufacturing a liquid ejecting head which ejects liquids other than ink in the same manner.

SUMMARY

An advantage of some aspects of the invention is to provide a method of manufacturing a liquid ejecting head which is able to perform judgment of an adhesion state with high precision.

According to an aspect of the invention, there is provided a method of manufacturing a liquid ejecting head in which members with different sizes which are formed of silicon are laminated with an adhesive agent and which ejects a liquid from a nozzle opening, the method including, in a state where a first member where a shape of a surface on a bonding surface side is relatively small and a second member where a shape of a surface on a bonding surface side is larger than the first member are adhered to each other using the adhesive agent, when the bonding surface is imaged by transmitting infrared rays through the first member or the second member using an imaging unit which performs imaging using infrared rays from one side in a laminating direction, measuring a distance between a reference point which is positionally aligned in the laminating direction with respect to the imaging unit and a surface which extends from the bonding surface of the second member, and imaging the bonding surface by calculating a focal point distance of the imaging unit based on the distance which is measured and a distance between the imaging unit and the reference point.

In this aspect, since it is possible to measure the focal point distance of the imaging unit with high precision, it is possible for the imaging unit to image an image with high precision based on the focal point distance. Accordingly, it is possible to confirm the state of the bonding surface with high precision and it is possible to suppress defects due to bonding failure.

In this case, the bonding surface may be imaged by transmitting infrared rays through the first member using the imaging unit and the bonding surface may be imaged by transmitting infrared rays through the second member using the imaging unit.

In this case, the reference point may be arranged on the imaging unit side in the laminating direction of the first member and the second member which are laminated and the reference point may also be arranged on the opposite side to the imaging unit in the laminating direction of the first member and the second member which are laminated.

In this case, it is preferable that the measuring of the distance between the reference point and the surface which extends from a bonding surface of the second member be performed using a non-contact type measuring unit. Due to this, it is possible to suppress the generation of scratches or chipping due to contact with the second member.

In this case, it is preferable that the measuring unit be a laser type range finder. Due to this, it is possible to measure the focal point distance with higher precision.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, detailed description will be given of the invention based on an embodiment.

Embodiment 1

Figure 1:
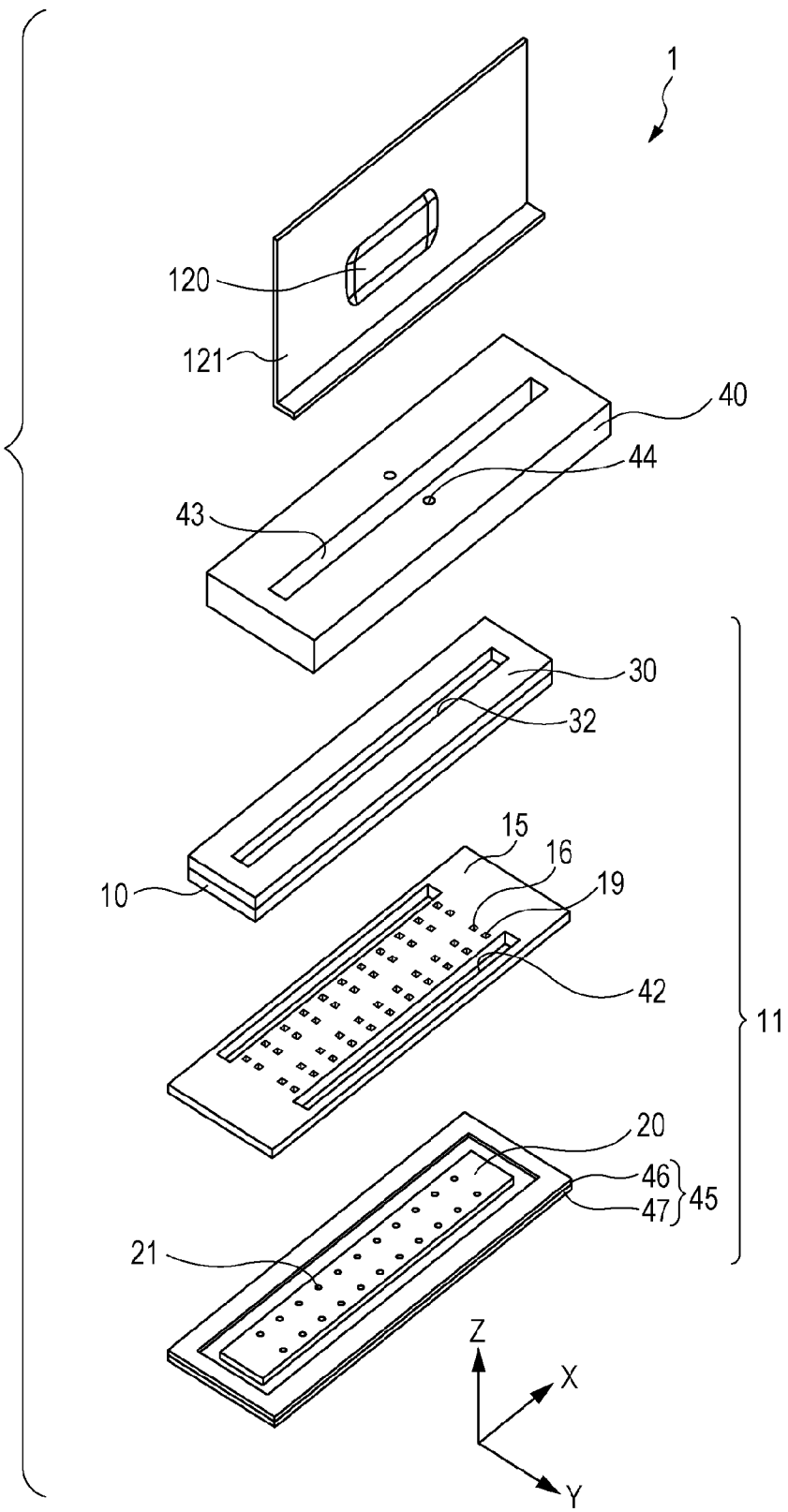
FIG. 1 is an exploded perspective diagram of a recording head according to Embodiment 1 of the invention.
Figure 2:
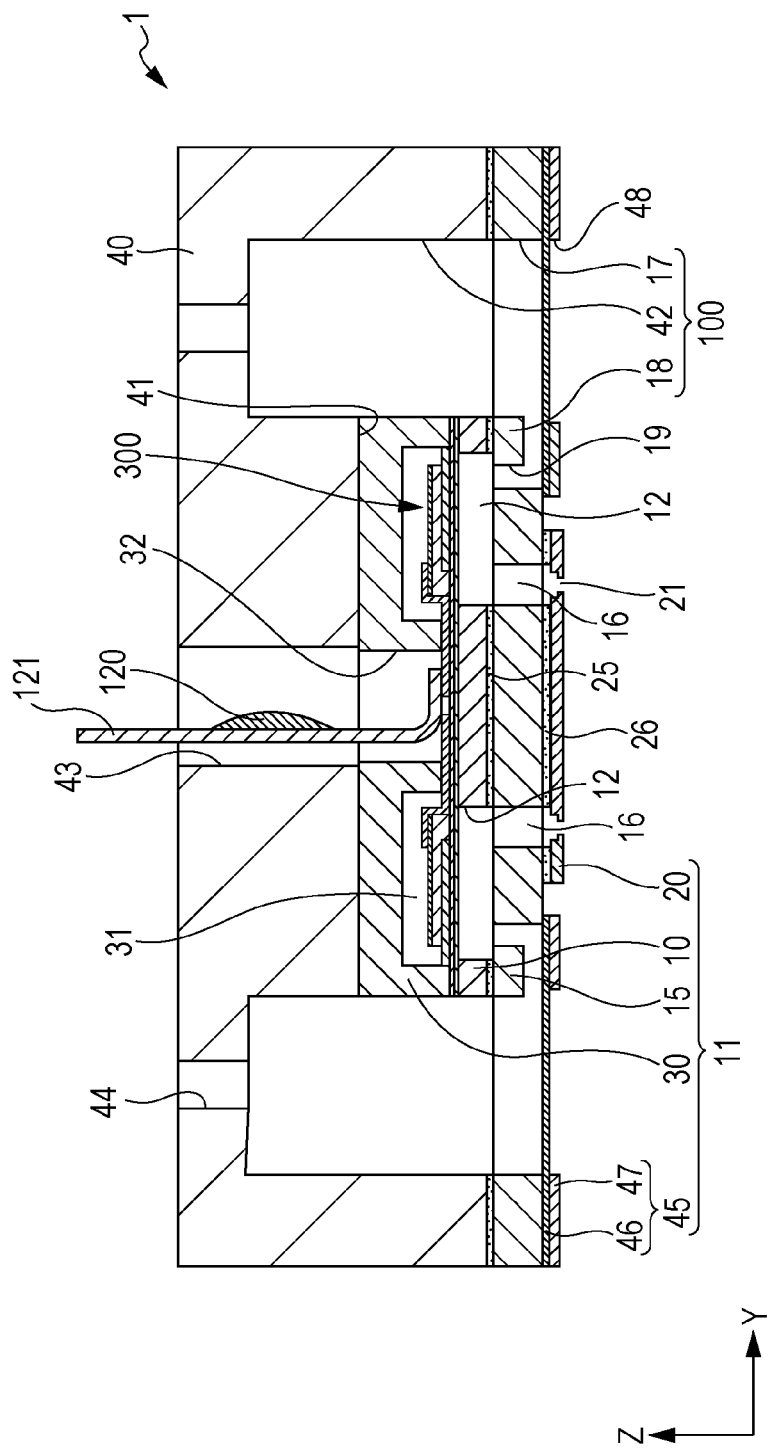
FIG. 2 is a cross sectional diagram of the recording head according to Embodiment 1 of the invention.

FIG. 1 is an exploded perspective diagram of an ink jet type recording head which is an example of a liquid ejecting head according to Embodiment 1 of the invention and FIG. 2 is a cross sectional diagram of the ink jet type recording head.

As shown in the diagram, the ink jet type recording head 1 of the present embodiment is provided with a plurality of members such as a head body 11 and a case member 40 and the plurality of members are bonded by an adhesive agent or the like. In the present embodiment, the head body 11 is equipped with a flow path forming substrate 10, a communication board 15, a nozzle plate 20, a protection substrate 30, and a compliance substrate 45.

The flow path forming substrate 10 which configures the head body 11 is formed of a silicon monocrystal substrate. Pressure generating chambers 12, which are partitioned by a plurality of partition walls, are lined up through anisotropic etching from one surface side in the flow path forming substrate 10 along a direction in which a plurality of nozzle openings 21 which discharge ink are lined up. Below, this direction is referred to as the lining up direction of the pressure generating chambers 12 or as a first direction X. In addition, a plurality of rows, two rows in the present embodiment, where the pressure generating chambers 12 are lined up in the first direction X are provided in the flow path forming substrate 10. A row alignment direction, which is the alignment direction of a plurality of rows of the pressure generating chambers 12 in which the pressure generating chambers 12 are formed along the first direction X, is referred to below as a second direction Y. Furthermore, a direction in which the flow path forming substrate 10, the communication board 15, the nozzle plate 20, and the protection substrate 30 are laminated is referred to below as a third direction Z.

In addition, a supply path or the like which adds flow path resistance of ink which flows into the pressure generating chambers 12 and where the opening area is narrower than the pressure generating chambers 12 may be provided on one end section side of the pressure generating chambers 12 in the second direction Y in the flow path forming substrate 10.

In addition, the communication board 15 is bonded with one surface side of the flow path forming substrate 10. In addition, the nozzle plate 20 where a plurality of nozzle openings 21 which communicate with each of the pressure generating chambers 12 are drilled is bonded with the communication board 15.

A nozzle communication path 16 which passes through the pressure generating chambers 12 and the nozzle openings 21 is provided in the communication board 15. The communication board 15 has a larger area than the flow path forming substrate 10 and the nozzle plate 20 has a smaller area than the flow path forming substrate 10. In this manner, it is possible to achieve a reduction in costs by making the area of the nozzle plate 20 comparatively small.

In addition, a first manifold section 17 and a second manifold section 18 which configure parts of a manifold 100 are provided in the communication board 15.

The first manifold section 17 is provided to pass through the communication board 15 in the thickness direction (the laminating direction of the communication board 15 and the flow path forming substrate 10).

In addition, the second manifold section 18 is provided to open on the nozzle plate 20 side of the communication board 15 without passing through the communication board 15 in the thickness direction.

Furthermore, a supply communication path 19 which communicates with one end section of the pressure generating chambers 12 in the second direction Y is independently provided for each of the pressure generating chambers 12 in the communication board 15. The supply communication path 19 passes through the second manifold section 18 and the pressure generating chambers 12.

In this manner, the communication board 15 is formed of a silicon monocrystal substrate. It is possible to suppress the generation of warping due to heating or cooling by using materials where the coefficient of linear expansion is equal to that of the flow path forming substrate 10 as the communication board 15. In addition, it is possible to form a high density flow path easily and with high precision by using the silicon monocrystal substrate for the flow path forming substrate 10 or the communication board 15.

In addition, in the present embodiment, the flow path forming substrate 10 and the communication board 15 are adhered via an adhesive agent 25.

In addition, the nozzle openings 21 which communicate with each of the pressure generating chambers 12 via the nozzle communication path 16 are formed in the nozzle plate 20. That is, the nozzle openings 21 which eject the same type of liquid (ink) are lined up in the first direction X and two rows of the nozzle openings 21 which are lined up in the first direction X are formed in the second direction Y.

It is possible to use a metal such as stainless steel (SUS), an organic material such as polyimide resin, a silicon monocrystal substrate, or the like as the nozzle plate 20. Here, it is possible to suppress the generation of warping due to heating or cooling, cracking due to heat, detaching, or the like by setting the linear expansion coefficients of the nozzle plate 20 and the communication board 15 to be equal by using a silicon monocrystal substrate as the nozzle plate 20. In addition, details will be described later; however, by using a silicon monocrystal substrate as the nozzle plate 20, it is possible to perform confirmation of a bonding surface in the present embodiment by transmitting infrared rays through the nozzle plate 20 and imaging the bonding surface of the nozzle plate 20 and the communication board 15 using an imaging unit which performs imaging using infrared rays.

In addition, in the present embodiment, the communication board 15 and the nozzle plate 20 are adhered via an adhesive agent 26.

On the other hand, a diaphragm is formed on the opposite surface side to the communication board 15 of the flow path forming substrate 10. In addition, a piezoelectric actuator 300 which is a pressure generating unit of the present embodiment is configured by sequentially laminating a first electrode, a piezoelectric body layer, and a second electrode on the diaphragm. In general, the piezoelectric actuator 300 is configured by setting either one of the electrodes of the piezoelectric actuator 300 as a common electrode and patterning the other electrode and the piezoelectric body layer for each of the pressure generating chambers 12.

In addition, the protection substrate 30 which has substantially the same size as the flow path forming substrate 10 is bonded with the surface on the piezoelectric actuator 300 side of the flow path forming substrate 10. The protection substrate 30 has a holding section 31 which is a space for protecting the piezoelectric actuator 300. In addition, a through hole 32 is provided to pass through the protection substrate 30 in the thickness direction (the laminating direction of the flow path forming substrate 10 and the protection substrate 30). The end section of a lead electrode which is drawn out from the second electrode is provided to extend so as to be exposed inside the through hole 32 and the lead electrode is electrically connected inside the through hole 32 with a wiring substrate 121 which is mounted with a driving circuit 120 such as a driving IC.

It is possible to suppress the generation of warping due to heating or cooling, cracking due to heat, detaching, or the like by setting the linear expansion coefficients of the protection substrate 30 and the flow path forming substrate 10 to be equal by using a silicon monocrystal substrate as the protection substrate 30. In addition, in the present embodiment, a bonded body where the flow path forming substrate 10 and the protection substrate 30 are bonded is referred to as an actuator unit.

In addition, the case member 40 which defines the manifold 100 which communicates with a plurality of the pressure generating chambers 12 and the head body 11 is fixed in the head body 11 with such a configuration. The case member 40 has substantially the same shape as the communication board 15 described above in a planar view and is bonded with the protection substrate 30 along with also being bonded with the communication board 15 described above. Specifically, the case member 40 has a concave section 41 with a depth where the flow path forming substrate 10 and the protection substrate 30 are accommodated on the protection substrate 30 side. The concave section 41 has a larger opening area than the surface which is bonded with the flow path forming substrate 10 of the protection substrate 30. Then, the opening surface on the nozzle plate 20 side of the concave section 41 is sealed by the communication board 15 in a state where the flow path forming substrate 10 or the like is accommodated in the concave section 41. Due to this, a third manifold section 42 is defined by the case member 40 and the head body 11 in an outer peripheral section of the flow path forming substrate 10. Then, the manifold 100 of the present embodiment is configured of the first manifold section 17 and the second manifold section 18 which are provided on the communication board 15 and the third manifold section 42 which is defined by the case member 40 and the head body 11.

Here, it is possible to use, for example, a resin, a metal, or the like as the material of the case member 40. Here, it is possible to carry out mass production at a low cost by forming the case member 40 of resin material.

In addition, the compliance substrate 45 is provided on the surface where the first manifold section 17 and the second manifold section 18 of the communication board 15 are opened. The compliance substrate 45 seals the openings of the first manifold section 17 and the second manifold section 18.

The compliance substrate 45 is equipped with a sealing film 46 and a fixing substrate 47 in the present embodiment. The sealing film 46 is formed of a thin film which has flexibility (for example, a thin film with a thickness of 20 μm or less which is formed of polyphenylene sulfide (PPS), stainless steel (SUS), or the like) and the fixing substrate 47 is formed of a hard material such as a metal such as stainless steel (SUS). Since the region which faces the manifold 100 of the fixing substrate 47 is an opening section 48 which is completely removed in the thickness direction, one surface of the manifold 100 is a compliance section which is a flexible section sealed only by the sealing film 46 which has flexibility.

Here, an introduction path 44 for supplying ink to each of the manifolds 100 by communicating with the manifolds 100 is provided in the case member 40. In addition, a connection port 43 where a wiring substrate 121 is inserted by communicating with the through hole 32 of the protection substrate 30 is provided in the case member 40.

When ink is ejected in the ink jet type recording head 1 with such a configuration, the ink is taken in from a retention unit such as an ink cartridge via the introduction path 44 and an inner section of the flow path is filled with ink from the manifold 100 up to the nozzle opening 21. After that, by applying a voltage to each of the piezoelectric actuators 300 which correspond to the pressure generating chambers 12 in accordance with the signal from the driving circuit 120, the piezoelectric actuator 300 and the diaphragm are bent and change shape. Due to this, the pressure inside the pressure generating chambers 12 is increased and ink droplets are ejected from a predetermined nozzle opening 21. Here, from the connection port 43 up to the nozzle opening 21 in the ink jet type recording head 1 of the present embodiment is referred to as a liquid flow path. That is, the liquid flow path is configured of the connection port 43, the manifold 100, the supply communication path 19, the pressure generating chambers 12, the nozzle communication path 16, and the nozzle opening 21.

Figure 3:
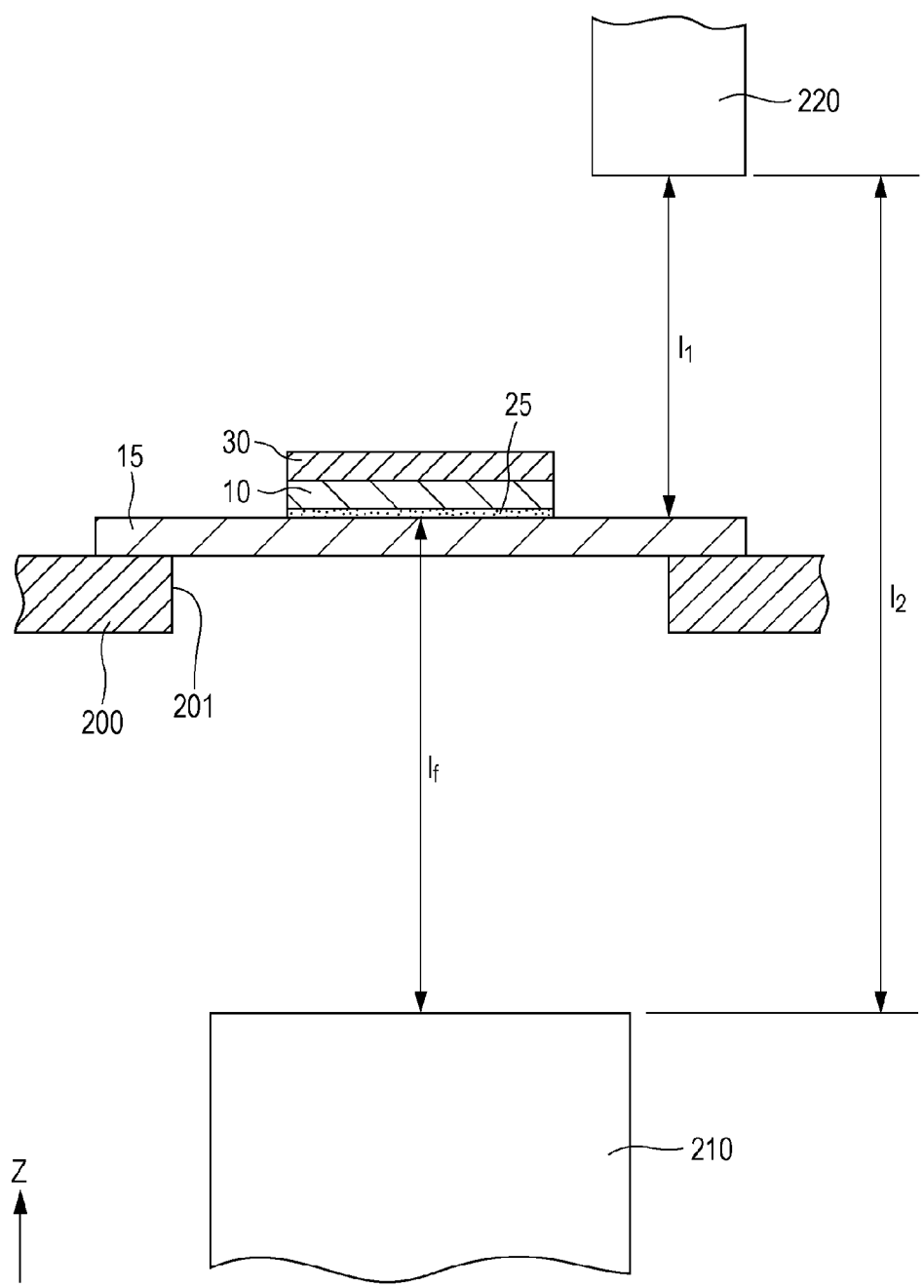
FIG. 3 is a cross sectional diagram which shows a method of manufacturing the recording head according to Embodiment 1 of the invention.
Figure 4:
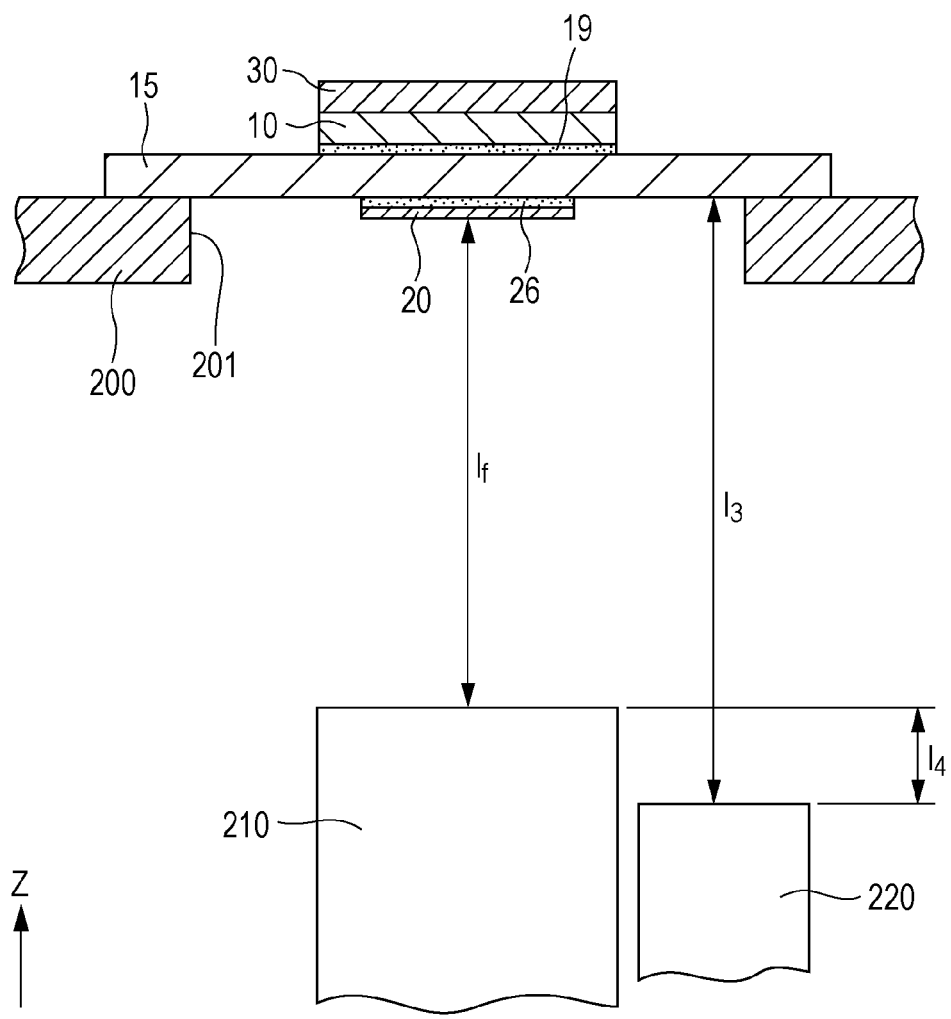
FIG. 4 is a cross sectional diagram which shows a method of manufacturing the recording head according to Embodiment 1 of the invention.

Here, description will be given of a method of manufacturing the ink jet type recording head 1 of the present embodiment with reference to FIG. 3 and FIG. 4. Here, FIG. 3 and FIG. 4 are cross sectional diagrams which show a method of manufacturing the ink jet type recording head which is an example of a liquid ejecting head according to Embodiment 1 of the invention.

Firstly, in the present embodiment, by setting the flow path forming substrate 10 as a first member and the communication board 15 where the bonding surface side with the first member has a larger area than the first member as a second member, the adhesion state is confirmed by imaging the bonding surface when the first member and the second member are adhered via the adhesive agent 25.

The piezoelectric actuator 300, the pressure generating chambers 12, and the like are formed in advance in the flow path forming substrate 10 of the present embodiment and additionally, the protection substrate 30 is bonded with the flow path forming substrate 10. In addition, the nozzle communication path 16, the first manifold section 17, the second manifold section 18, and the like are formed in advance on the communication board 15.

After the flow path forming substrate 10 and the communication board 15 are adhered using the adhesive agent 25, the bonding surface of the flow path forming substrate 10 and the communication board 15 is imaged using an imaging unit which performs imaging using infrared rays. That is, since silicon has a property of transmitting infrared rays, the bonding surface of the flow path forming substrate 10 and the communication board 15 is imaged using infrared rays which are transmitted through the flow path forming substrate 10 or the communication board 15 which is formed of silicon. In addition, the protection substrate 30 is bonded with the flow path forming substrate 10 in the present embodiment; however, since the protection substrate 30 of the present embodiment is formed of silicon, the protection substrate 30 also transmits infrared rays. However, in a case where the flow path forming substrate 10 and the protection substrate 30 are bonded using an adhesive agent or the like, since the adhesive agent reflects the infrared rays, it is not possible to image the region which overlaps the bonding region of the flow path forming substrate 10 and the protection substrate 30. In addition, in a case where there is a layer of a metal or the like which does not transmit infrared rays between the flow path forming substrate 10 and the protection substrate 30, it is also not possible to image the overlapped region in the same manner.

An apparatus which images a bonding surface of the flow path forming substrate 10 and the communication board 15 has a base 200 as shown in FIG. 3.

The base 200 holds the bonded body of the flow path forming substrate 10 and the communication board 15 on one surface and has an opening section 201 which passes through the base 200 in the thickness direction. The opening section 201 is formed with an opening area which is smaller than the communication board 15 and larger than the flow path forming substrate 10. In the present embodiment, the communication board 15 side of the bonded body is held on one surface of the base 200.

An imaging unit 210 of the present embodiment is arranged on the other surface side of the base 200. That is, in the present embodiment, the imaging unit 210 is arranged on the other surface side which is the opposite side to the one surface of the base 200 which holds the bonded body. Here, the imaging unit 210 operates by irradiating infrared rays to a target via an irradiating optical system and condensing light of the infrared rays which are reflected by the target with an object optical system. Examples of the imaging unit 210 which performs imaging using infrared rays include an infrared microscope or an infrared camera. An infrared camera is used as the imaging unit 210 in the present embodiment.

By arranging the imaging unit 210 on the other surface side of the base 200 in a state where the bonded body is held on one surface side of the base 200 by setting the communication board on the base 200 side, it is possible for the imaging unit 210 to image the bonding surface of the communication board 15 and the flow path forming substrate 10 by transmitting infrared rays through the communication board 15.

In addition, a measuring unit 220 is provided on one surface side of the base 200. The measuring unit 220 is provided at a position which faces a surface which extends from the bonding surface of the communication board 15 and the flow path forming substrate 10, that is, the region which is not covered by the flow path forming substrate 10 in the bonding surface of the communication board 15 in the third direction Z.

Here, the measuring unit 220 measures a distance $l_1$ between a reference point which is positionally aligned in the third direction Z with respect to the imaging unit 210 and a surface which extends from the bonding surface of the communication board 15.

That is, it is not possible for the measuring unit 220 to directly measure the bonding surface of the communication board 15 and the flow path forming substrate 10 and the reference point; however, since the side of the bonding surface of the communication board 15 and the flow path forming substrate 10 has a larger area than that of the flow path forming substrate 10, a distance from the reference point to the bonding surface of the communication board 15 and the flow path forming substrate 10 is measured by measuring the distance $l_1$ between the surface, which extends from the bonding surface which is at the same position as the bonding surface bonded with the flow path forming substrate 10 of the communication board 15 in the third direction Z, and the reference point.

Examples of the measuring unit 220 include a non-contact type range finder (a distance measuring device) such as an optical type, an ultrasonic type, or a laser type, a contact type range finder (a distance measuring device) such as a Vernier micrometer, or the like. Here, in a case where a contact type range finder is used as the measuring unit 220, since there is a concern that scratches, chipping, or the like will be generated in the communication board 15 due to the measuring unit 220 coming into contact with the communication board 15, it is preferable to use a non-contact type range finder as the measuring unit 220 and it is particularly favorable to use a laser type range finder (a laser distance measuring device) with high precision.

In the present embodiment, the distance $l_1$ between the reference point and the surface which extends from the bonding surface of the communication board 15 is measured by setting a position which is a measuring reference of the measuring unit 220 as the reference point. Here, the reference point of the measuring unit 220 in the third direction Z is positionally aligned in the third direction Z with respect to the imaging unit 210 as described above. The distance between the reference point of the measuring unit 220 and the imaging unit 210 is set as $l_2$.

Then, the focal point distance $l_f$ of the imaging unit 210 is calculated based on the distance $l_1$ from the reference point to the surface which extends from the bonding surface of the communication board 15 and the distance $l_2$ between the reference point of the measuring unit 220 and the imaging unit 210, which are measured by the measuring unit 220. That is, in the present embodiment, it is possible for the focal point distance $l_f$ of the imaging unit 210 to be calculated using the expression $l_f = l_2 - l_1$.

Then, based on the focal point distance $l_f$, the imaging unit 210 images the bonding surface of the communication board 15 and the flow path forming substrate 10. Here, based on the calculated focal point distance $l_f$, the focal point may be matched by adjusting the object optical system of the imaging unit 210 or the focal point may be matched by moving the imaging unit 210 in the third direction Z.

Since the focal point distance $l_f$ of the imaging unit 210 is accurately measured, it is possible to set the image which is imaged in this manner as a high precision image. Then, it is possible to confirm the state of the bonding surface of the flow path forming substrate 10 and the communication board 15 from the image which is imaged in this manner. That is, infrared rays are reflected in the region where the adhesive agent 25 is present and infrared rays are transmitted in the region where an adhesive agent is not present. A bonding surface is represented in the image which is imaged according to the presence or absence of the reflection of infrared rays. Then, it is possible to confirm a bonding failure and to determine whether a product passes or fails by confirming the state of the bonding surface from the image which is imaged.

As described above, it is possible to measure the focal point distance $l_f$ between the imaging unit 210 and the bonding surface of the communication board 15 which is a target and the flow path forming substrate 10 with high precision by using the surface which extends from the bonding surface of the communication board 15 which is the second member where the area on the bonding surface side is large. Accordingly, it is possible for the image where the bonding surface is imaged to be highly precise and it is possible to judge the state of the bonding surface with high precision without imaging the bonding surface using the imaging unit 210 in a state where the focal point does not match. In other words, it is possible to confirm the bonding state of the flow path forming substrate 10 and the communication board 15 based on the image which is imaged using the imaging unit 210. Here, the pressure generating chambers 12 are formed with high density in the flow path forming substrate 10 and when an adhesion failure occurs between the image walls which define the pressure generating chambers 12 and the communication board 15 at the time of being adhered to the communication board 15, defects occur such as not being able to discharge ink droplets normally. In the present embodiment, since it is possible to judge adhesion failures with high precision, it is possible to suppress the generation of defects such as discharge failures or the like.

Here, it is possible to use the method of imaging a bonding surface of two members which are formed of silicon by measuring a focal point distance using the imaging unit 210 and the measuring unit 220 in the same manner for other members which configure the ink jet type recording head 1.

For example, in a case where the nozzle plate 20 in the ink jet type recording head 1 of the present embodiment is formed of silicon, a bonding surface where the first member (the nozzle plate 20) and the second member (the communication board 15) are bonded using the adhesive agent 26 may be imaged using the imaging unit 210 after setting the nozzle plate 20 as the first member and setting the communication board 15 where the side of the bonding surface with the first member has a larger area than that of the first member as a second member.

Here, it is possible to image the bonding surface of the nozzle plate 20 and the communication board 15 using the apparatus shown in FIG. 4 which is the same apparatus as in FIG. 3. Here, the same numerals are applied to the same members as in FIG. 3 and repeated description thereof will be omitted.

As shown in FIG. 4, a bonded body where the communication board 15 where the flow path forming substrate 10 or the like is bonded and the nozzle plate 20 are adhered via the adhesive agent 26 is held on one surface of the base 200. At this time, the bonded body is held so as to arrange the nozzle plate 20 on the base 200 side.

The imaging unit 210 is arranged on the other surface side of the base 200. In addition, the measuring unit 220 is arranged on the other surface side of the base 200.

The measuring unit 220 measures a distance $l_3$ between the reference point and the surface which extends from the bonding surface of the communication board 15 and the nozzle plate 20, that is, the surface which is at the same position as the nozzle plate 20 of the communication board 15 in the third direction Z.

In addition, the reference point of the measuring unit 220 is positionally aligned in the third direction Z with respect to the imaging unit 210 and when a distance between the reference point of the measuring unit 220 and the position which is a reference of the focal point distance of the imaging unit 210 is set as $l_4$, it is possible for the focal point distance $l_f$ of the imaging unit 210 to be calculated based on the distance $l_3$ which is measured by the measuring unit 220 and the distance $l_4$ between the reference point and the imaging unit 210. Here, as shown in FIG. 4, in a case where the measuring unit 220 is arranged at the position which is separated to be further from the communication board 15 than from the imaging unit 210, it is possible for the focal point distance $l_f$ to be calculated with the expression $l_f = l_3 - l_4$. In addition, in a case where the measuring unit 220 is arranged on the side closer to the communication board 15 than to the imaging unit 210, it is possible for the focal point distance $l_f$ to be calculated with the expression $l_f = l_3 + l_4$.

In this manner, it is possible to measure the focal point distance $l_f$ between the imaging unit 210 and the bonding surface which is imaged with high precision by measuring using the surface which extends from the bonding surface of the communication board 15 which is the second member where the area on the bonding surface side is large. Accordingly, it is possible to judge the state of the bonding surface of the nozzle plate 20 and the communication board 15 with high precision by imaging the bonding surface with high precision using the imaging unit 210 in a state where the focal points match without imaging the bonding surface using the imaging unit 210 in a state where the focal points do not match.

Here, since the base 200 and the imaging unit 210 have the same arrangement as in FIG. 3 described above, it is possible to use both the imaging unit 210 which images the bonding surface of the communication board 15 and the flow path forming substrate 10 and the imaging unit 210 which images the bonding surface of the communication board 15 and the nozzle plate 20 together as one. Due to this, it is not necessary to use two of the imaging unit 210, which are expensive, and it is possible to reduce costs.

In addition, in the example shown in FIG. 4, since the imaging unit 210 and the measuring unit 220 are arranged on the same surface side with respect to the base 200 (the imaging target), the measuring unit 220 may measure the distance between the base point of the focal point distance of the imaging unit 210 as a reference point and the surface which extends from the bonding surface of the communication board 15. Due to this, it is possible to set the measuring result of the measuring unit 220 as the focal point distance of the imaging unit 210 as it is. Accordingly, it is not necessary to calculate the focal point distance and it is possible to measure the focal point distance easily and in a short time.

In addition, for the image of the bonding surface which is imaged by the imaging unit 210, it is possible to automate imaging of the bonding surface and determination of whether the bonding state passes or fails, for example, by performing passing or failing determination according to the imaging process. In addition, since it is possible to automate the determination of whether the bonding state passes or fails, for example, it is possible to automate assembly of each of the members and automatically perform (unmanned) confirmation of the bonding state of the automatic assembly. Accordingly, it is possible to easily automate from the assembly to inspection. Naturally, an inspector may perform the confirmation of the bonding state from the image where the bonding surface is imaged.

Other Embodiments

Above, description is given of one embodiment of the invention; however, the basic configuration of the invention is not limited to the embodiment described above.

For example, in Embodiment 1 described above, description is given where the flow path forming substrate 10 or the nozzle plate 20 is the first member and the communication board 15 is the second member; however, in a case where the ink jet type recording head 1 has another member which is formed of silicon, the member may be equivalent to the first member or the second member. That is, the first member and the second member of the invention are not particularly limited as long as the members are members with different sizes which are formed of silicon and are adhered with an adhesive agent.

In addition, in Embodiment 1 described above, the imaging unit 210 which images the bonding surface of the flow path forming substrate 10 and the communication board 15 and the imaging unit 210 which images the bonding surface of the communication board 15 and the nozzle plate 20 are used together as one imaging unit 210; however, the invention is not particularly limited to this, and for example, the imaging unit 210 may be respectively provided on both sides to interpose the base. Due to this, it is possible to image the bonding surface of the nozzle plate 20 and the communication board 15 with an arrangement such that the nozzle plate 20 side is the opposite side to the base.

In addition, in Embodiment 1 described above, the bonding surface of the flow path forming substrate 10 and the communication board 15 is imaged by transmitting infrared rays through the communication board 15; however, the invention is not particularly limited to this, and the imaging of the bonding surface may be performed by transmitting infrared rays through the flow path forming substrate 10 which is the first member. Here, in a case where the protection substrate 30 is bonded with the flow path forming substrate 10 in advance as in Embodiment 1 described above, it is necessary to transmit infrared rays through the protection substrate 30 and the flow path forming substrate 10; however, since the infrared rays which are transmitted through the protection substrate 30 are reflected in the adhesion region where the flow path forming substrate 10 and the protection substrate 30 are adhered, it is not possible to image the portion which overlaps the adhesion region of the flow path forming substrate 10 and the protection substrate 30.

In addition, in Embodiment 1 described above, the bonding surface of the communication board 15 and the nozzle plate 20 is imaged by transmitting infrared rays through the nozzle plate 20, but the invention is not particularly limited to this and the bonding surface may be imaged by transmitting infrared rays through the communication board 15.

Furthermore, in Embodiment 1 described above, description is given where the thin film type piezoelectric actuator 300 is used as a pressure generating unit which generates pressure changes in the pressure generating chambers 12, but the invention is not particularly limited to this, and for example, it is possible to use a thick film type piezoelectric actuator which is formed by a method such as sticking a green sheet, a longitudinal vibration type piezoelectric actuator which alternately laminates a piezoelectric material and an electrode forming material and expands and contracts these materials in a shaft direction, or the like. In addition, as the pressure generating unit, it is possible to use unit which discharges liquid droplets from a nozzle opening using bubbles which are generated by heating heater elements by arranging the heater elements inside pressure generating chambers, a so called electrostatic type actuator which discharges liquid droplets from a nozzle opening by changing the shape of a diaphragm using static electricity by generating static electricity between the diaphragm and an electrode, or the like.

Furthermore, the invention widely targets all liquid ejecting heads and it is also possible to apply the invention to, for example, a recording head such as various types of ink jet type recording head which are used in image recording apparatuses such as printers, a color material ejecting head which is used for manufacturing color filters such as a liquid crystal display, an electrode material ejecting head which is used for electrode forming such as organic EL displays and field emission displays (FED), a bio-organic matter ejecting head which is used for manufacturing bio chips, and the like.

What is claimed is:

1. A method of manufacturing a liquid ejecting head in which members with different sizes which are formed of silicon are laminated with an adhesive agent and which ejects a liquid from a nozzle opening, the method comprising:

in a state where a first member where a shape of a surface on a bonding surface side is relatively small and a second member where a shape of a surface on a bonding surface side is larger than the first member are adhered to each other using the adhesive agent, when the bonding surface is imaged by transmitting infrared rays through the first member or the second member using an imaging unit which performs imaging using infrared rays from one side in a laminating direction, measuring a distance between a reference point which is positionally aligned in the laminating direction with respect to the imaging unit and a surface which extends from the bonding surface of the second member; and imaging the bonding surface by calculating a focal point distance of the imaging unit based on the distance which is measured and a distance between the imaging unit and the reference point.

2. The method of manufacturing a liquid ejecting head according to claim 1, wherein the bonding surface is imaged by transmitting infrared rays through the first member using the imaging unit.

3. The method of manufacturing a liquid ejecting head according to claim 1, wherein the bonding surface is imaged by transmitting infrared rays through the second member using the imaging unit.

4. The method of manufacturing a liquid ejecting head according to claim 1, wherein the reference point is arranged on the imaging unit side in the laminating direction of the first member and the second member which are laminated.

5. The method of manufacturing a liquid ejecting head according to claim 1, wherein the reference point is arranged on the opposite side to the imaging unit in the laminating direction of the first member and the second member which are laminated.

6. The method of manufacturing a liquid ejecting head according to claim 1, wherein the measuring of the distance between the reference point and the surface which extends from the bonding surface of the second member is performed using a non-contact type measuring unit.

7. The method of manufacturing a liquid ejecting head according to claim 6, wherein the measuring unit is a laser type range finder.

8. The method of manufacturing a liquid ejecting head according to claim 6, wherein the measuring unit and the imaging unit are positioned on the same side of the bonding surface.

9. The method of manufacturing a liquid ejecting head according to claim 6, wherein the measuring unit and the imaging unit are positioned on opposing sides of the bonding surface.

10. The method of manufacturing a liquid ejecting head according to claim 1, further comprising:

confirming a state of the bonding surface, represented by the presence or absence of reflection of infrared rays, to determine whether the liquid ejecting head passes or fails manufacture.

* * * * *